(12) United States Patent
Cui et al.

(10) Patent No.: US 11,184,517 B1
(45) Date of Patent: Nov. 23, 2021

(54) FACILITATION OF COLLABORATIVE CAMERA FIELD OF VIEW MAPPING

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Nigel Bradley, Canton, GA (US); Ari Craine, Marietta, GA (US); Robert Koch, Peachtree Corners, GA (US)

(73) Assignees: AT&T Intellectual Property I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/913,266

(22) Filed: Jun. 26, 2020

(51) Int. Cl.
*H04N 5/232* (2006.01)
*H04N 7/18* (2006.01)

(52) U.S. Cl.
CPC ..... *H04N 5/23206* (2013.01); *H04N 5/23299* (2018.08); *H04N 7/181* (2013.01)

(58) Field of Classification Search
CPC ........... H04N 5/23206; H04N 5/23299; H04N 7/181; G08B 13/19621; G08B 13/19643; G08B 13/16945; G08B 13/19645; B64C 2201/127; G06T 2207/10032
See application file for complete search history.

(56) References Cited

U.S. PATENT DOCUMENTS

| | | |
|---|---|---|
| 6,302,007 B1 | 10/2001 | Tobler |
| 6,384,740 B1 | 5/2002 | Al-Ahmed |
| 6,392,564 B1 | 5/2002 | Mackey et al. |
| 6,558,164 B2 | 5/2003 | Raha |
| 6,716,106 B2 | 4/2004 | Wang et al. |
| 7,336,297 B2 | 2/2008 | Ishigami et al. |
| 7,451,041 B2 | 11/2008 | Laumeyer et al. |

(Continued)

FOREIGN PATENT DOCUMENTS

| | | |
|---|---|---|
| CN | 103108083 | 3/2015 |
| CN | 107798252 | 10/2019 |

(Continued)

OTHER PUBLICATIONS

Roston "Google's Nearby Sharing demonstrated on video before release" https://www.slashgear.com/googles-nearby-sharing-demonstrated-on-video-before-release-24607665/. 9 pages.

(Continued)

*Primary Examiner* — Brian P Yenke
(74) *Attorney, Agent, or Firm* — Amin, Turocy & Watson, LLP

(57) ABSTRACT

A system of cameras can be used to generate a complete field of view within an edge network. For example, one camera can have a field of view where part of the view is obstructed by an object and/or by the camera's orientation. Yet another camera that is a part of the edge network can supplement the view of the first camera by providing an alternate view. The two views can be stitched together by a coordinate system such that a complete field of view can be utilized by both cameras. Additionally, where a field of view is not available by any stationary camera, the system can dispatch a mobile camera to help supplement the views.

20 Claims, 10 Drawing Sheets

(56) References Cited

U.S. PATENT DOCUMENTS

| | | |
|---|---|---|
| 7,636,630 B2 | 12/2009 | Fushiki et al. |
| 7,697,479 B2 | 4/2010 | Metke et al. |
| 7,982,634 B2 | 7/2011 | Arrighetti |
| 8,274,563 B1 | 9/2012 | Bunch |
| 8,375,106 B2 | 2/2013 | Sparks |
| 8,417,663 B2 | 4/2013 | Cho et al. |
| 8,482,609 B1 | 7/2013 | Mishra et al. |
| 8,706,131 B2 | 4/2014 | Winters |
| 8,830,299 B2 | 9/2014 | Osipov et al. |
| 8,924,240 B2 | 12/2014 | Depura et al. |
| 9,036,902 B2 | 5/2015 | Nathan et al. |
| 9,092,908 B2 | 7/2015 | Rapoport et al. |
| 9,113,786 B2 | 8/2015 | Li |
| 9,123,014 B1 | 9/2015 | Erdmann et al. |
| 9,195,843 B2 | 11/2015 | MacAskill et al. |
| 9,212,926 B2 | 12/2015 | Attard et al. |
| 9,216,509 B2 | 12/2015 | Renkis |
| 9,247,120 B2 * | 1/2016 | Thomas ................ H04N 7/181 |
| 9,357,181 B2 | 5/2016 | Fujimatsu et al. |
| 9,392,508 B2 | 7/2016 | Senarath et al. |
| 9,407,880 B2 | 8/2016 | Renkis |
| 9,467,923 B2 | 10/2016 | Karaoguz |
| 9,509,900 B2 | 11/2016 | Jo |
| 9,585,038 B2 | 2/2017 | Al-Shalash et al. |
| 9,614,958 B2 | 4/2017 | Rademacher et al. |
| 9,747,502 B2 | 8/2017 | Renkis |
| 9,775,001 B2 | 9/2017 | Dunkin et al. |
| 9,809,158 B2 | 11/2017 | Geller |
| 9,905,131 B2 | 2/2018 | Lai |
| 9,940,530 B2 | 4/2018 | Lai |
| 9,996,749 B2 | 6/2018 | Bataller et al. |
| 10,057,604 B2 | 8/2018 | Von Novak et al. |
| 10,070,035 B2 | 9/2018 | Slavin et al. |
| 10,091,203 B2 | 10/2018 | Galloway et al. |
| 10,225,705 B2 | 3/2019 | Bokestad et al. |
| 10,296,794 B2 | 5/2019 | Ratti |
| 10,305,910 B2 | 5/2019 | Galloway et al. |
| 10,318,828 B2 | 6/2019 | Hampiholi |
| 10,321,283 B2 | 6/2019 | Johnson et al. |
| 10,347,127 B2 | 7/2019 | Droz et al. |
| 10,358,143 B2 | 7/2019 | Jain et al. |
| 10,360,481 B2 * | 7/2019 | Gopalan ............... G06K 9/6262 |
| 10,366,511 B2 * | 7/2019 | Goldman ................ G06T 17/05 |
| 10,366,586 B1 | 7/2019 | Leizerovich et al. |
| 10,389,982 B1 | 8/2019 | Fu et al. |
| 10,402,634 B2 | 9/2019 | Kozakaya |
| 10,477,188 B2 * | 11/2019 | Stiglic .................. H04N 13/156 |
| 10,513,274 B1 | 12/2019 | Sung et al. |
| 10,516,858 B2 * | 12/2019 | Watanabe ............. G08G 1/205 |
| 10,582,163 B2 | 3/2020 | Hodge et al. |
| 10,585,942 B2 | 3/2020 | Ramer et al. |
| 10,586,118 B2 | 3/2020 | Guo et al. |
| 10,643,467 B2 | 5/2020 | Alon |
| 10,735,882 B2 * | 8/2020 | Han ....................... G06F 3/0346 |
| 2003/0053658 A1 | 3/2003 | Pavlidis |
| 2004/0008253 A1 | 1/2004 | Monroe |
| 2004/0203883 A1 | 10/2004 | Jollis |
| 2004/0218910 A1 | 11/2004 | Chang et al. |
| 2005/0122397 A1 | 6/2005 | Henson et al. |
| 2006/0059557 A1 | 3/2006 | Markham et al. |
| 2006/0230030 A1 | 10/2006 | Volpa et al. |
| 2008/0048886 A1 | 2/2008 | Brown et al. |
| 2008/0100705 A1 | 5/2008 | Kister et al. |
| 2008/0224862 A1 | 9/2008 | Cirker |
| 2008/0319604 A1 | 12/2008 | Follmer et al. |
| 2010/0182428 A1 | 7/2010 | Lu et al. |
| 2010/0267403 A1 | 10/2010 | Lungaro et al. |
| 2012/0120248 A1 | 5/2012 | Han et al. |
| 2012/0324002 A1 | 12/2012 | Chen |
| 2013/0086467 A1 | 4/2013 | Weber et al. |
| 2013/0103496 A1 | 4/2013 | Shekar et al. |
| 2013/0215266 A1 | 8/2013 | Trundle et al. |
| 2014/0210644 A1 | 7/2014 | Breed |
| 2014/0302774 A1 | 10/2014 | Burke et al. |
| 2015/0042802 A1 | 2/2015 | Kim |
| 2015/0104074 A1 * | 4/2015 | Vondran, Jr. ............... G06T 5/50 382/106 |
| 2015/0126230 A1 | 5/2015 | Lohtia |
| 2016/0042767 A1 | 2/2016 | Araya et al. |
| 2016/0050396 A1 | 2/2016 | Gali et al. |
| 2016/0063332 A1 | 3/2016 | Sisbot et al. |
| 2016/0173827 A1 * | 6/2016 | Dannan ............ G08B 13/19608 348/143 |
| 2016/0203641 A1 | 7/2016 | Bostick et al. |
| 2016/0241818 A1 | 8/2016 | Palanisamy et al. |
| 2016/0379074 A1 | 12/2016 | Nielsen et al. |
| 2016/0380820 A1 | 12/2016 | Horvitz et al. |
| 2017/0006431 A1 | 1/2017 | Donovan et al. |
| 2017/0076599 A1 | 3/2017 | Gupta et al. |
| 2017/0105146 A1 | 4/2017 | Zeng et al. |
| 2017/0154638 A1 | 6/2017 | Hwang et al. |
| 2017/0364755 A1 | 12/2017 | Wu et al. |
| 2018/0091741 A1 * | 3/2018 | Ida ..................... H04N 5/23296 |
| 2018/0129653 A1 | 5/2018 | Wang et al. |
| 2018/0130354 A1 | 5/2018 | Bender et al. |
| 2018/0131864 A1 * | 5/2018 | Bisti ....................... G06T 7/269 |
| 2018/0158197 A1 | 6/2018 | Dasgupta et al. |
| 2018/0278894 A1 | 9/2018 | Kanga et al. |
| 2018/0332213 A1 * | 11/2018 | Kucharski ............. H04N 7/185 |
| 2018/0354509 A1 | 12/2018 | Mullins |
| 2018/0376111 A1 | 12/2018 | Mrowiec et al. |
| 2019/0001987 A1 | 1/2019 | Kim et al. |
| 2019/0014513 A1 | 1/2019 | Yang et al. |
| 2019/0141298 A1 | 5/2019 | Vaidya et al. |
| 2019/0154872 A1 | 5/2019 | Leduc |
| 2019/0172345 A1 | 6/2019 | Lin et al. |
| 2019/0197354 A1 | 6/2019 | Law et al. |
| 2019/0215671 A1 | 7/2019 | Takii et al. |
| 2019/0281205 A1 | 9/2019 | Dewasurendra et al. |
| 2019/0333113 A1 | 10/2019 | Carlson et al. |
| 2019/0370980 A1 | 12/2019 | Hollander et al. |
| 2019/0377345 A1 | 12/2019 | Bachrach et al. |
| 2019/0378054 A1 | 12/2019 | Pinel et al. |
| 2020/0033845 A1 | 1/2020 | Park |
| 2020/0064869 A1 * | 2/2020 | Pickett .................. H04N 7/181 |
| 2020/0074853 A1 | 3/2020 | Miller et al. |
| 2020/0074866 A1 * | 3/2020 | Delaney ............... G08G 5/0069 |
| 2020/0241575 A1 * | 7/2020 | Meisenholder .......... G05D 1/12 |
| 2020/0336708 A1 * | 10/2020 | Hadas .................... H04N 7/181 |
| 2020/0374483 A1 * | 11/2020 | Kleinrock ............... H04L 67/42 |
| 2021/0105442 A1 | 4/2021 | Shoa Hassani Lashdan et al. |

FOREIGN PATENT DOCUMENTS

| | | |
|---|---|---|
| EP | 2937812 | 10/2015 |
| EP | 2913796 | 3/2019 |
| GB | 2498035 | 7/2013 |
| KR | 101642487 | 7/2016 |
| WO | 2018/116488 | 6/2018 |
| WO | 2019/053695 | 3/2019 |

OTHER PUBLICATIONS

"Proximity and cross device communication" https://developers.google.com/nearby, Last Accessed Jun. 5, 2020. 2 pages.

Whitwam "How Google Nearby works, and how you can take advantage of it" Greenbot, https://www.greenbot.com/article/3078180/how-google-nearby-works-and-how-you-can-take-advantage-of-it.html, Jun. 13, 2016, 7 pages.

McCracken "Lyve's Photo-Organizing App Adds Mix, A Real-Time, Location-Based Sharing Feature" https://www.fastcompany.com/3045024/lyves-photo-organizing-app-adds-mix-a-real-time-location-based-sharing-feature, Apr. 13, 015, 7 pages.

Constine "Facebook Launches "Nearby Friends" With Opt-In Real-Time Location Sharing to Help You Meet Up" Techcrunch.com, https://techcrunch.com/2014/04/17/facebook-nearby-friends/?renderMode=ie11, Apr. 17, 2014, 29 pages.

"Sblind Proximity Sharing" https://techcrunch.com/2014/04/17/facebook-nearby-friends/?renderMode=ie11, Last Accessed Jun. 5, 2020, 3 pages.

Drang "And now it's all this" https://leancrew.com/all-this/2013/01/geofencing-in-flickr/, Jan. 6, 2013, 4 pages.

(56) References Cited

OTHER PUBLICATIONS

"Location Automation: A Deeper Look at Alarm.com's Geo-Services" https://www.alarm.com/blog/geo-services-location-automation, Feb. 10, 2015, 8 pages.
Drop News Staff "What Is AirDrop?" iDROPNEWS, Nov. 7, 2017. 17 pages.
"SocialRadar app tells you about the people around you" News Atlas, Mar. 17, 2014, 9 pages.
McGarry "What Is Apple's ARKit? Everything You Need to Know" tom's guide, Jan. 24, 2018, 9 pages.
"15 Reasons To Use Drones For Security Surveillance" ALTi, https://www.altiuas.com/drone-surveillance/, Last Accessed Jun. 5, 2020, 3 pages.
"Remote monitoring by autonomous drone: a new way to secure sensitive sites" Azur Drones, https://www.azurdrones.com/remote-monitonng-by-drone/, Apr. 3, 2020, 4 pages.
"Drone Automation Solution for Security & Surveillance" flytbase, https://flytbase.com/drone-security-solution/, Last Accessed Jun. 5, 2020, 6 pages.
"Safe cities: Using smart tech for public security" BBC Future, https://www.bbc.com/future/bespoke/specials/connected-world/government.html, Last Accessed Jun. 5, 2020, 10 pages.
Tarapong, et al. "Swarm Eye: A Distributed Autonomous Surveillance System" IJACSA) International Journal of Advanced Computer Science and Applications, vol. 9, No. 12, 2018, 10 pages.
"Intelligent AI Video Analytics" https://www.intelli-vision.com/intelligent-video-analytics/, Last Accessed Aug. 24, 2020 3 pages.
"Icetana" Icetana, https://icetana.com/, Last Accessed Aug. 24, 2020, 4 pages.
Stanley "The Dawn of Robot Surveillance: AI, Video Analytics, and Privacy" American Civil Liberties Union, Jun. 2019, 50 pages.
Ma et al. "Pattern Discovery for Video Surveillance" ISVC 2005, LNCS 3804, pp. 347-354, 2005.
Priya et al. "Human walking motion detection and classification of actions from Video Sequences" International Journal of Conceptions on Computing and Information Technology, vol. 3, Issue. 1, Apr. 2015; ISSN: 2345-9808.
Paul et al. "Human detection in surveillance videos and its applications—a review" EURASIP Journal on Advances in Signal Processing 2013, 2013:176, 16 pages.
Verma et al. "A review of supervised and unsupervised machine learning techniques for suspicious behavior recognition in intelligent surveillance system" Int. j. inf. tecnol.. Sep. 20, 2019, 14 pages.
"Schlenoff et al. ""An Approach to Predicting the Location of Moving Objects During On-RoadNavigation"" 18th International Joint Conference on Artificial Intelligence, Aug. 2003, 10 pages."
Vu et al. "Grid-based localization and local mapping with moving object detection and tracking" https://hal.archives-ouvertes.fr/hal-01023076, Jul. 11, 2014, 28 pages.
Chen, Xiaoji "Engineering Uber's Self-Driving Car Visualization Platform for the Web" Uber Engineering, https://eng.uber.com/atg-dataviz/, Aug. 28, 2017.
Stynes et al. "A Probabilistic Approach to User Mobility Prediction for Wireless Services" IEEE, 2016, 6 pages.
Guo et al. "A zone-based content pre-caching strategy in vehicular edge networks" Future Generation Computer Systems 106 (2020) 22-33.
Notice of Allowance dated Feb. 12, 2021 for U.S. Appl. No. 16/913,309, 41 pages.
Notice of Allowance dated Sep. 9, 2021 for U.S. Appl. No. 16/905,160, 60 pages.
Office Action dated Sep. 8, 2021 for U.S. Appl. No. 16/902,983, 23 pages.
"Parham Aarabi, Safwat Zaky,""Robust sound localization using multi-source audiovisual information fusion"", Information Fusion, vol. 2, Issue 3, 2001, pp. 209-223, ISSN 1566-2535, https://doi.org/10.1016/S1566-2535 (01 )00035-5. (Year: 2001) ".
M. Alaei and J. M. Barcelo-Ordinas, "A hybrid cooperative design for energy-efficient surveillance in Wireless Multimedia Sensor Networks," European Wireless 2012; 18th European Wireless Conference 2012, 2012, pp. 1-7. (Year: 2012).
Alaei, Mohammad, and Jose M. Barcelo-Ordinas 2010. "A Method for Clustering and Cooperation in Wireless Multimedia Sensor Networks" Sensors 10, No. 4: 3145-3169. https://doi.org/10.3390/s100403145 (Year: 2010).
B. Chen, C. Chen and J. Wang, "Smart Homecare Surveillance System: Behavior Identification," in IEEE Transactions on Systems, Man, and Cybernetics: Systems, vol. 43, No. 6, pp. 1279-1289, Nov. 2013, doi: 10.1109/TS (Year: 2013).
Crocco et al., "Audio Surveillance: A system review", ACM Computing Surveys vol. 48 Issue 4, May 2016 Article No. 52, pp. 1-46 (Year: 2016).
Kotus, J., Lopatka, K. & Czyzewski, A. "Detection and localization of selected acoustic events in acoustic field for smart surveillance applications". Multi med Tools Appl 68, 5-21 (2014). https://doi.org/10.1007/s 11042-012-1183-0 (Year: 2014).
Lopatka, Kuba, Jozef Kot US, and Andrzej Czyzewski. "Application of Vector Sensors to Acoustic Surveillance of a Public Interior Space." Archives of Acoustics 36.4 (2011): 851-860. (Year: 2011).
E. Menegatti, E. Mumolo, M. Nolich, and E. Pagel Io. 2004. "A surveillance system based on audio and video sensory agents cooperating with a mobile robot". In Intelligent Autonomous Systems 8. IOS Press, 335-343. (Year: 2004).

\* cited by examiner

FACILITATION OF COLLABORATIVE CAMERA FIELD OF VIEW MAPPING

TECHNICAL FIELD

This disclosure relates generally to facilitating a field of view for cameras. For example, this disclosure relates to facilitating a field of view for cameras based on a camera-to-camera collaboration system.

BACKGROUND

A video camera is a camera used for electronic motion picture acquisition in the television industry, but now is common in other applications as well. Video cameras are used primarily in two modes. The first is live television, where the camera feeds real time images directly to a screen for immediate observation. A few cameras still serve live television production, but most live connections are for security, military/tactical, and industrial operations where surreptitious or remote viewing is required. In the second mode, the images are recorded to a storage device for archiving or further processing; for many years, videotape was the primary format used for this purpose, but was gradually supplanted by optical disc, hard disk, and then flash memory. Recorded video is used in television production, and in surveillance and monitoring tasks in which unattended recording of a situation is required for later analysis.

The above-described background relating to facilitating collaborative camera field of view mapping is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
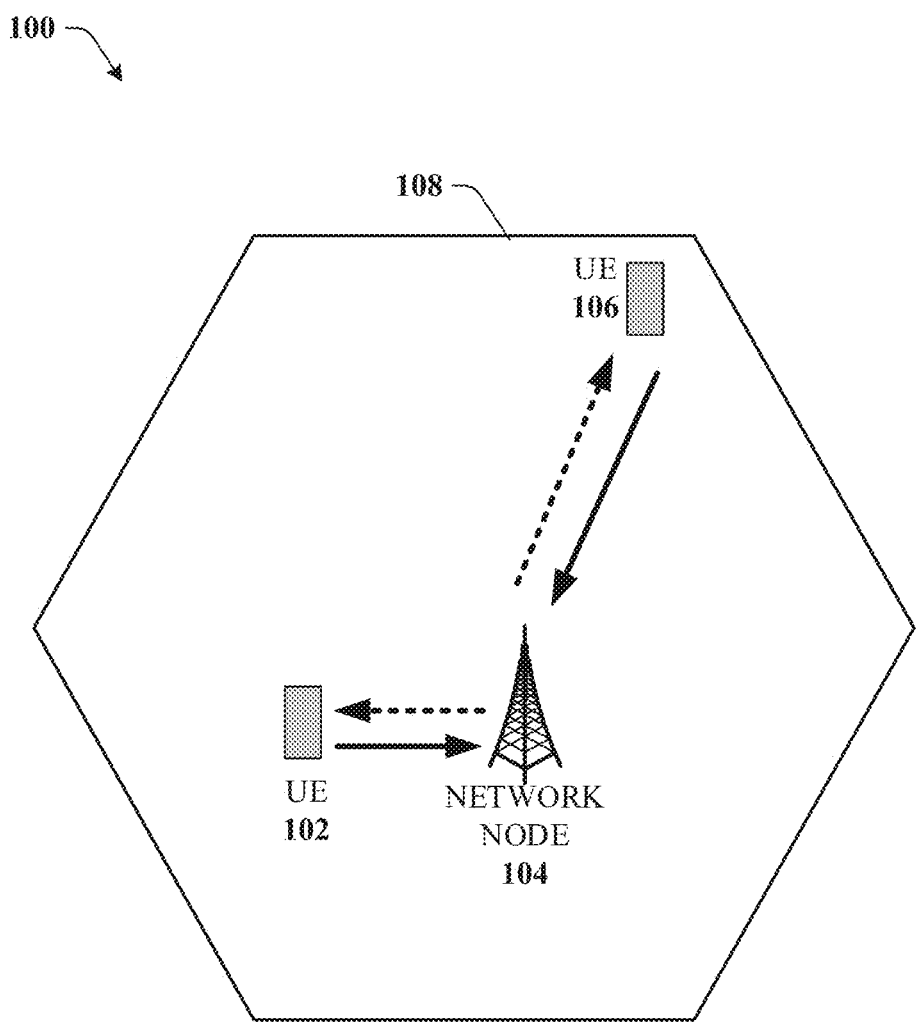
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate collaborative camera field of view mapping. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate collaborative camera field of view mapping. Facilitating collaborative camera field of view mapping can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, IOT device, laptop embedded equipped (LEE), laptop mounted equipment (LME), USB dongles, etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

Edge computing is a distributed computing paradigm that brings computation and data storage closer to the location where it is needed, to improve response times and save bandwidth. Edge networks can host applications and application components at the edge servers, resulting in commercial edge computing services that host applications, such as dealer locators, shopping carts, real-time data aggregators, and ad insertion engines. Modern edge computing significantly extends this approach through virtualization technology that makes it easier to deploy and run a wide range of applications on the edge servers.

Devices at the edge are repeatedly consuming data coming from the cloud, forcing companies to build content delivery networks to decentralize data and service provisioning, thereby leveraging physical proximity to the end user. In a similar way, an aim of edge computing is to move the computation away from data centers towards the edge of the network, exploiting smart objects, mobile phones, or network gateways to perform tasks and provide services on behalf of the cloud. By moving services to the edge, it is possible to provide content caching, service delivery, storage and IoT management resulting in better response times and transfer rates.

A system of cameras can be operational within a geographic area. Cameras can be connected to an edge node via an access point device. For example, the access point can be any point, or device, or node (e.g., network node, access device, a network access device comprising a network node, a connection point to a telecommunications network, a transceiver, etc.) that by which a camera can attach or connect to a wireless network. The edge node can comprise a server and a database that can be comprised within a single unit or multiple units. The edge node can communicate with a cloud server and database that can also communicate with other edge nodes and cameras. The cameras can contain location-sensing logic, such as a global positioning system (GPS) to be aware of their own location in three-dimensions (3-D). Alternatively, the edge node can maintain a record of the three-dimensional location of each camera connected to the edge node.

The cameras can also be equipped with laser imaging detection and ranging (LIDAR) capabilities to enable them to send out laser transmissions and receive responses in order for the cameras to be able to sense the distance from the camera to objects in the area and/or other cameras. LIDAR is a method for measuring distances by illuminating the target with laser light and measuring the reflection with a sensor. Differences in laser return times and wavelengths can then be used to make digital 3-D representations of the target. It has terrestrial, airborne, and mobile applications.

The cameras may be fixed or mobile. The edge node or the cloud server/database can control the collaborative system. For instance, if a first camera cannot view a point that is within the potential view of another camera, edge node can direct the other camera to change its orientation so as to view the point, as needs dictate. Likewise, the edge node can determine that no camera within the area has a point in view and may summon a mobile camera, such as on a drone, and direct it to the location of the point.

In one embodiment, described herein is a method comprising receiving, by network equipment comprising a processor, first coordinate data based on a first field of view of a first camera. The method can comprise receiving, by the network equipment, second coordinate data based on a second field of view of a second camera. In response to the receiving of the first coordinate data and the second coordinate data, the method can comprise aggregating, by the network equipment, the first coordinate data and the second coordinate data, resulting in aggregated coordinate data. Furthermore, based on the aggregated coordinate data, the method can comprise identifying, by the network equipment, a blind spot that is not within the first field of view or the second field of view. Additionally, in response to the identifying, the method can comprise dispatching, by the network equipment, a mobile camera relative to the blind spot to facilitate a third field of view comprising a view of the blind spot.

According to another embodiment, a system can facilitate, obtaining first coordinate data associate with a first field of view of a first image capture device. The system can facilitate obtaining second coordinate data associated with a second field of view of a second image capture device. In response to the obtaining of the first coordinate data and the second coordinate data, the system can comprise aggregating the first coordinate data and the second coordinate data, resulting in aggregated coordinate data. Additionally, based on the aggregated coordinate data, the system can comprise identifying a hidden area determined not be within the first field of view. Furthermore, in response to the identifying the hidden area, the system can comprise sending request data to a mobile image capture device, determined to be within a defined proximity to the hidden area, to request that the mobile image capture device capture a view of the hidden area.

According to yet another embodiment, described herein is a machine-readable medium that can perform the operations comprising receiving first coordinate data associated with the first field of view based on a first field of view of a first camera. Based on a second field of view of a second camera, the machine-readable medium can perform the operations comprising receiving second coordinate data associated with the second field of view. Additionally, in response to the receiving of the first coordinate data and the second coordinate data, the machine-readable medium can perform the operations comprising combining the first coordinate data and the second coordinate data, resulting in combined coordinate data. Furthermore, based on the combined coordinate data, the machine-readable medium can perform the operations comprising determining a currently unobservable position that is not within the first field of view. Furthermore, in response to determining that the currently unobservable position is not within the first field of view, the machine-readable medium can comprise sending request data representative of a request to dispatch an unmanned aerial vehicle to a location to observe the currently unobservable position.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102, 106. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or other next generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain.

Figure 2:
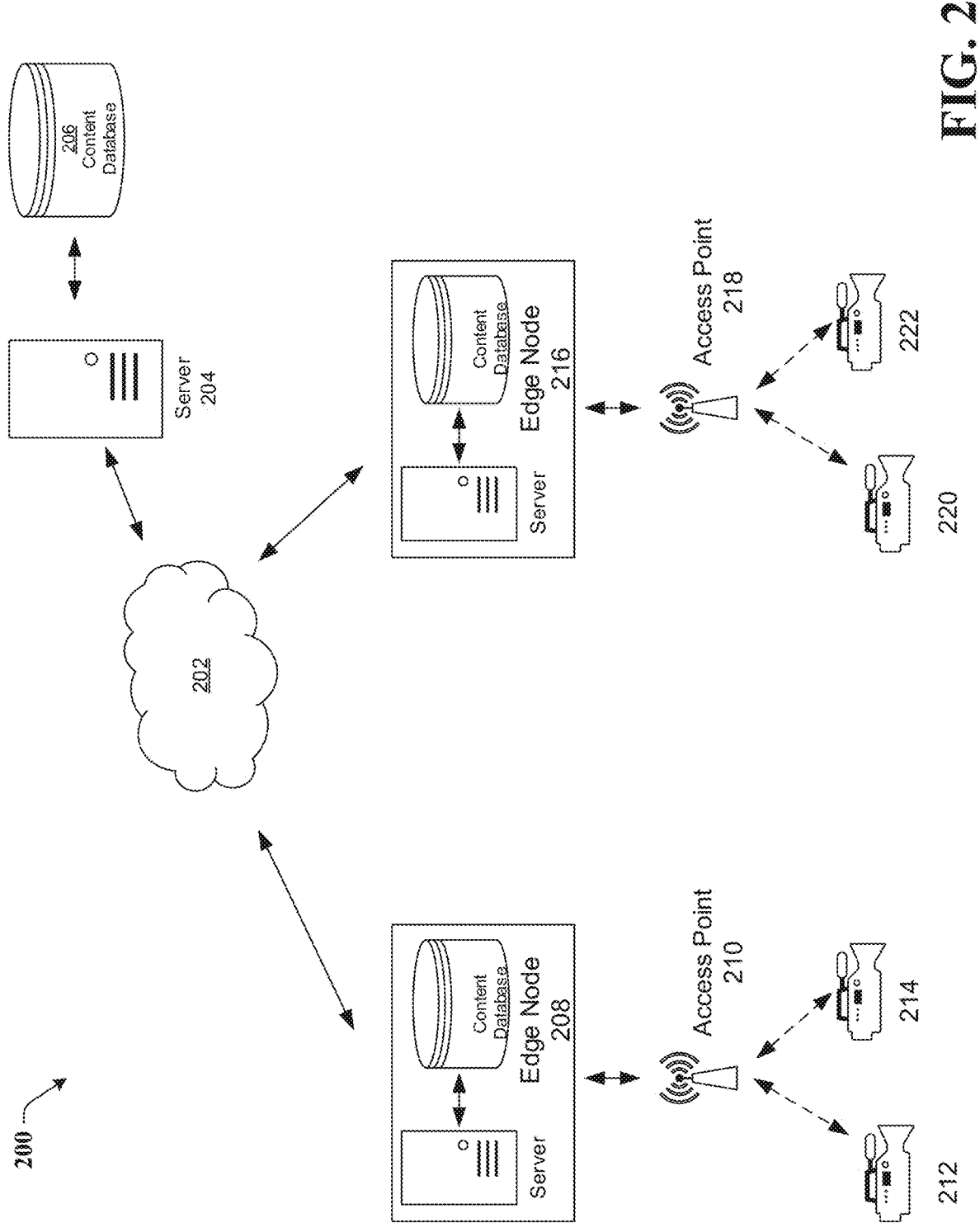
FIG. 2 illustrates an example schematic system block diagram of an edge node camera collaboration system, according to one or more embodiments.

Referring now to FIG. 2, illustrated is an example schematic system block diagram of an edge node camera collaboration system.

The edge node camera collaboration system can comprise one or more cameras that can communicate with an edge node via an access point. For example, camera 212 and camera 214 can communicate with edge node 208 via the access point 210 and can be operational within a geographic area. The cameras 212, 214 can be connected to edge node 208 via access point 210. The edge node 208 can comprise a server and a database that can be comprised within a single unit or multiple units. The edge node 208 can communicate with a cloud 202 server 204 and database 206 that can also communicate with other edge nodes 216 and cameras 220, 222 via access point 218. The cameras 212, 214, 220, 222 can contain location-sensing logic, such as a global positioning system (GPS) to be aware of their own location in three-dimensions (3-D). Alternatively, the edge nodes 208, 216 can maintain a record of the three-dimensional location of each camera 212, 214, 220, 222 connected to it. The edge nodes can also communicate to each other, via the cloud, which cameras are connected to it.

Figure 3:
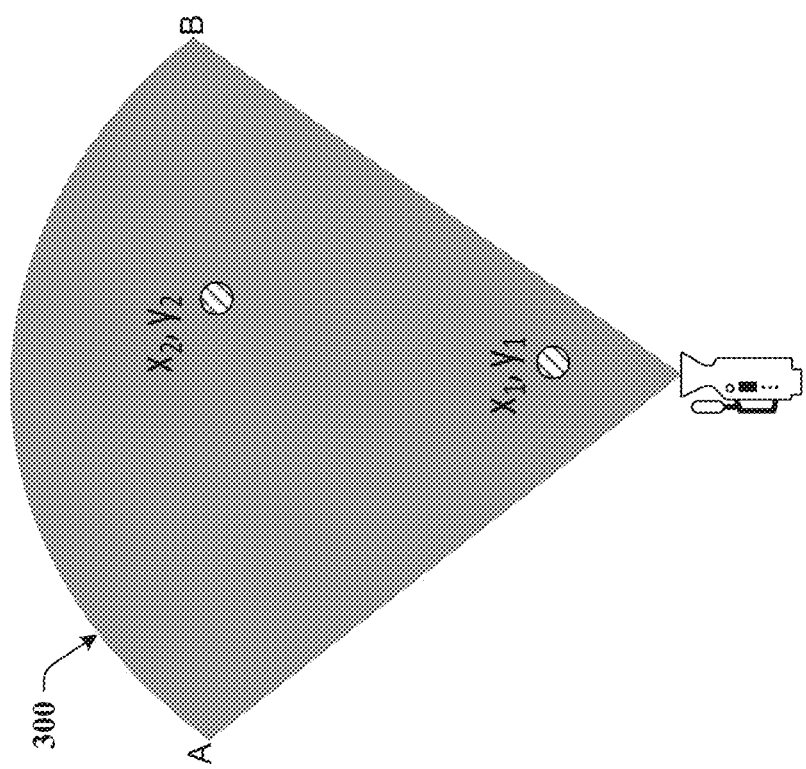
FIG. 3 illustrates an example schematic system block diagram of an unobstructed view map of points within the field of view of a camera, according to one or more embodiments.

Referring now to FIG. 3, illustrated is an example schematic system block diagram of an unobstructed view map of points within the field of view of a camera.

FIG. 3 depicts an unobstructed view map of points within the field of view of camera 212. This map can represent the field of view 300 within the frame of the camera 212 for a specific orientation for a specific point in time. The map shown displays a representation of two sets of x/y coordinates (e.g., $x_1$, $y_1$, and $x_2$, $y_2$) within view, as seen from above. The map can be stored as a data set of x/y points within view. The camera generates data that represents its range of view (e.g., the distance it can "see") and the angle of view and can use this data to determine x/y coordinates for points A and B. By default, any x/y points within the shaded area can be considered to be in the field of view 300 of camera 212. For example, ($x_1$, $y_1$) can represent one point within the field of view of camera 212, while ($x_2$, $y_2$) can represent another point within the field of view of the camera 212.

Figure 4:
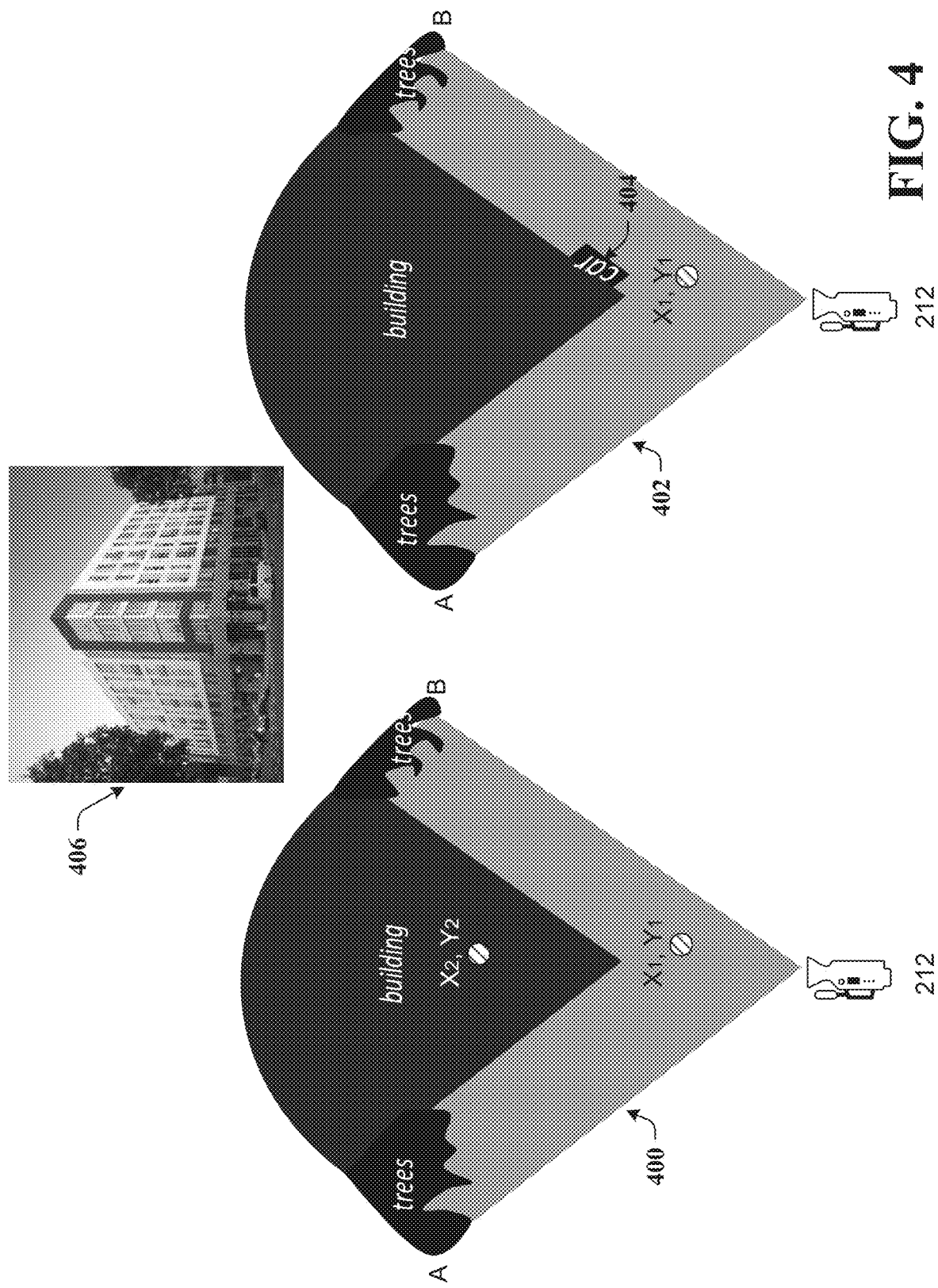
FIG. 4 illustrates an example schematic system block diagram of an obstructed view map of points within the field of view of a camera, according to one or more embodiments.

Referring now to FIG. 4, illustrated is an example schematic system block diagram of an obstructed view map of points within the field of view of a camera, according to one or more embodiments.

Camera 212 can use LIDAR pulses and/or other location-based technologies to create a point map of x/y coordinates that are within its field of view 400 at time t1 and its field of view 402 at time t2. The map now shows points ($x_1$, $y_1$) in the field of view (FOV) 400, of view of the camera 212, and excludes those that are not. For instance, ($x_2$, $y_2$) is obstructed from the field of view 400, of the camera 212, due to a building obstructing view of those coordinates. Picture 406 displays a representation of the building as shown within the FOVs 400, 402. The set of points within the field of view can be stored in the camera, sent to the edge node 208 for storage, and/or sent to the cloud database 204 for storage. Storage of those coordinates can be used to compare the FOV 400 at time t1 to the FOV 402 at time t2. For example, a comparison of FOV 400 to FOV 402 can differences between the two FOVs 400, 402, such as a car 404 that is now present in FOV 402 at time t2 that was not present earlier in FOV 400 at time t1. Time data can also be captured by the camera 212 and listed with any new obstructions determined to be present at different times.

The x/y points recorded can use a universal system, such as GPS coordinates, so that other cameras within or outside of the cloud edge may use the same set as a reference. For example, coordinate and angle data received the camera 212 can be sent to and/or utilized by the camera 222 for other functions.

The set of datapoints can also be a function of one or more planes. For example, the camera 212 can also create a similar dataset in different z-dimensions using the same LIDAR technique. For instance, when z is 10 feet or higher, the camera's 212 FOV 402 can be above the car 404. By using LIDAR to create a number of z-slices, a complete listing of the x/y/z points that are within the camera's 212 FOV at a point in time can be generated. Maps can be generated on a periodic or continual basis to account for changes in the surrounding area over time. Additionally, the generation of a map can be a function of the system determining a difference in the FOV between the time t1 and t2.

Figure 5:
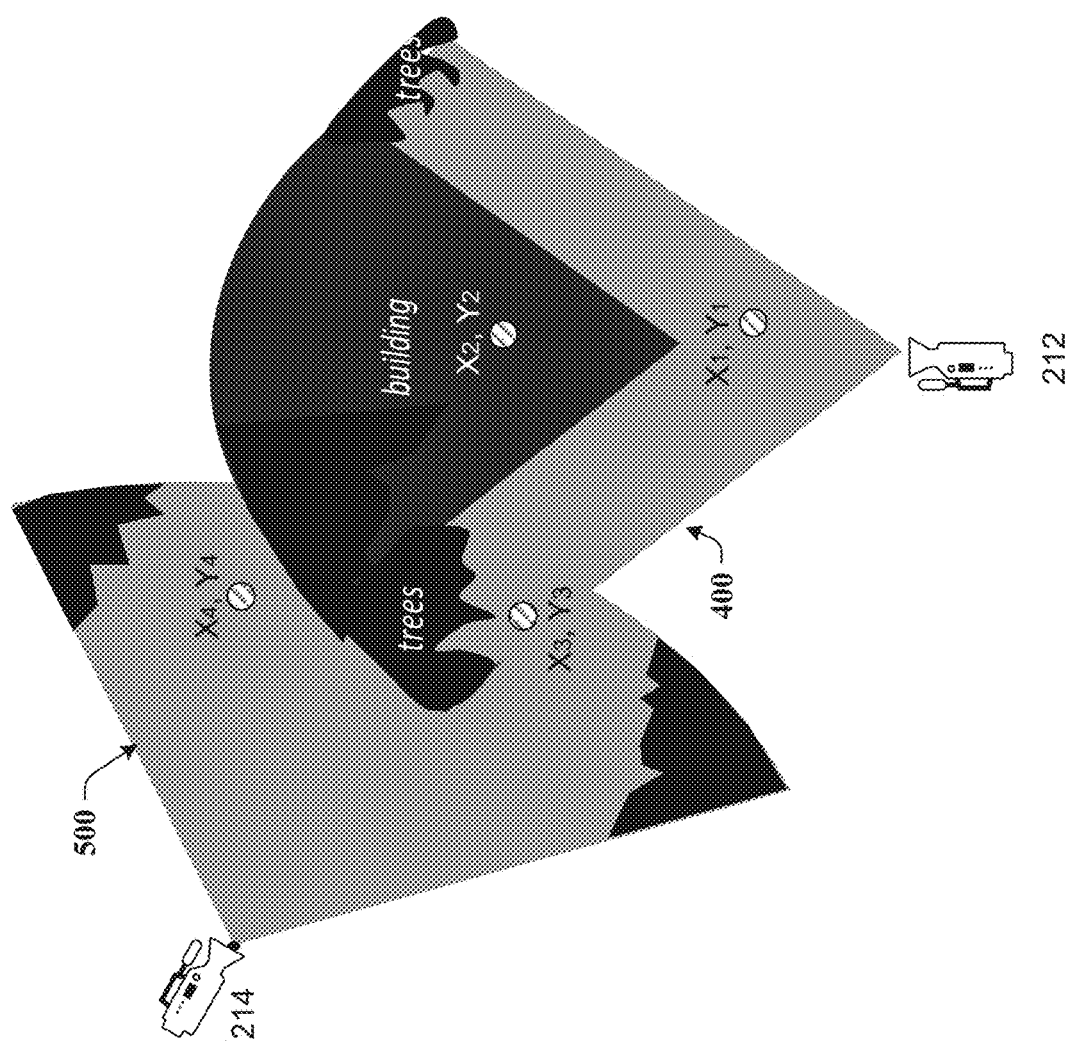
FIG. 5 illustrates an example schematic system block diagram of multi-camera collaboration, according to one or more embodiments.

Referring now to FIG. 5 illustrates an example schematic system block diagram of multi-camera collaboration, according to one or more embodiments.

Similar to camera 212, another camera 214 can generate its own set of x/y/z points that are within its FOV 500. For both cameras, the set of points generated can be time-stamped for synchronization. The cameras 212, 214 can both share their set of x/y/z points within view with the edge node 208 and the cloud 202, the server 204, and the content database 206. The edge node 208 or cloud server 204 can combine the data to create a combined map of points in view when the cameras 212, 214 work together. In this manner, for instance, ($x_3$, $y_1$, n) is out of view for the camera 214, but in view for the team of cameras 212, 214 when they collaborate. Likewise, ($x_4$, $y_4$, n) is out of view for the camera 212 but in view for the team of cameras 212, 214 when they collaborate.

Furthermore, additional cameras can be added to the system to facilitate additional views. By sharing the data, the real-time fields of view of a system of cameras can be known. Moreover, blind spots can also be identified for points that are not in view of any camera. For cameras that are mobile or may have their orientation changed, a 360° field of view can be created. For a 360° view, the set of datapoints that are currently in frame can be designated as such, with the remainder of the viewable points denoted as potentially within view.

Figure 6:
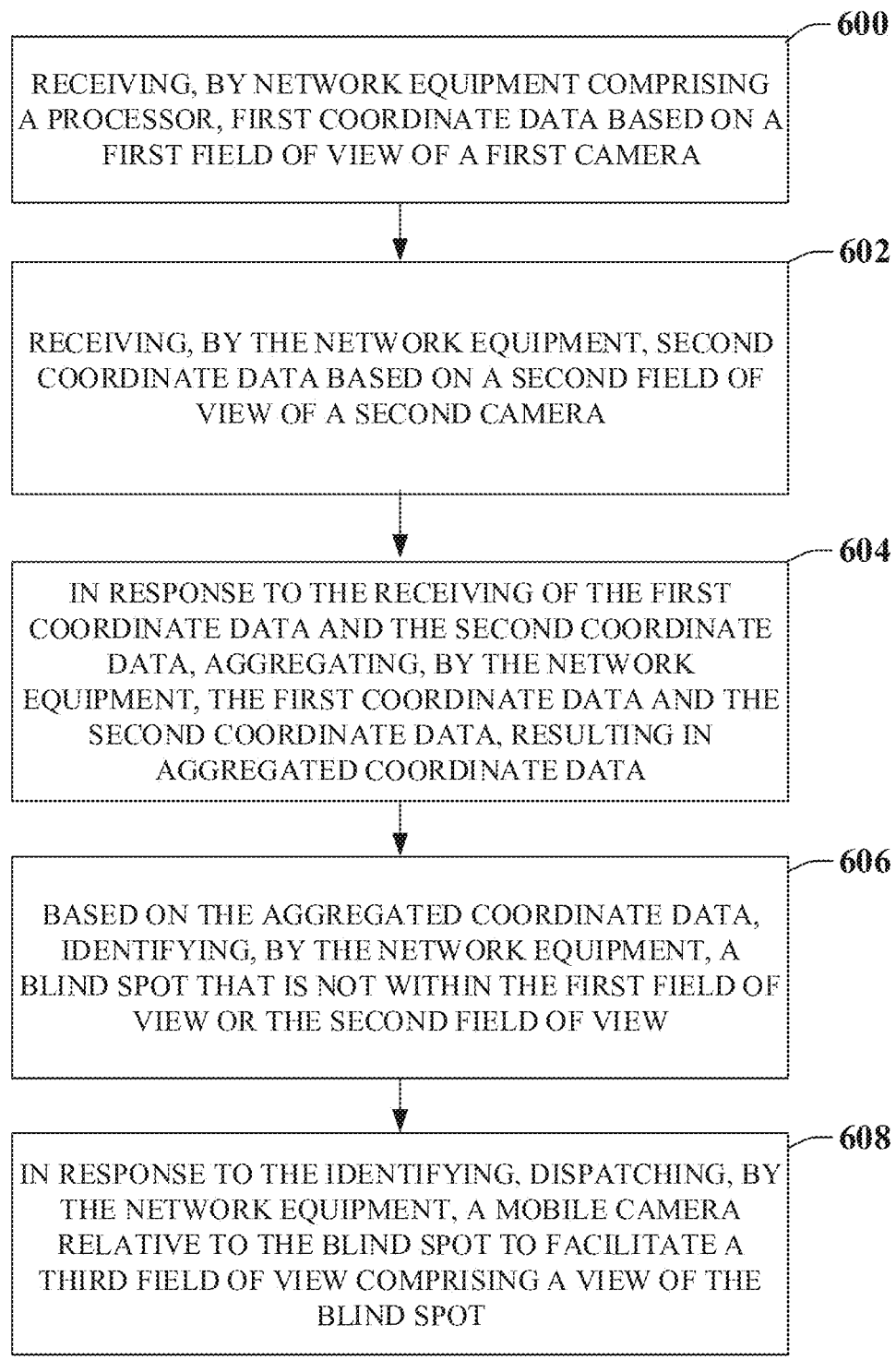
FIG. 6 illustrates an example flow diagram for a method for facilitating collaborative camera field of view mapping according to one or more embodiments.

Referring now to FIG. 6, illustrated is an example flow diagram for a method for facilitating collaborative camera field of view mapping according to one or more embodiments.

At element 600, the method can comprise receiving, by network equipment comprising a processor, first coordinate data based on a first field of view of a first camera. At element 602, the method can comprise receiving, by the network equipment, second coordinate data based on a second field of view of a second camera. In response to the receiving of the first coordinate data and the second coordinate data, at element 604, the method can comprise aggregating, by the network equipment, the first coordinate data and the second coordinate data, resulting in aggregated coordinate data. Furthermore, based on the aggregated coordinate data, at element 606, the method can comprise identifying, by the network equipment, a blind spot that is not within the first field of view or the second field of view. At element 608, in response to the identifying, the method can comprise dispatching, by the network equipment, a mobile camera relative to the blind spot to facilitate a third field of view comprising a view of the blind spot.

Figure 7:
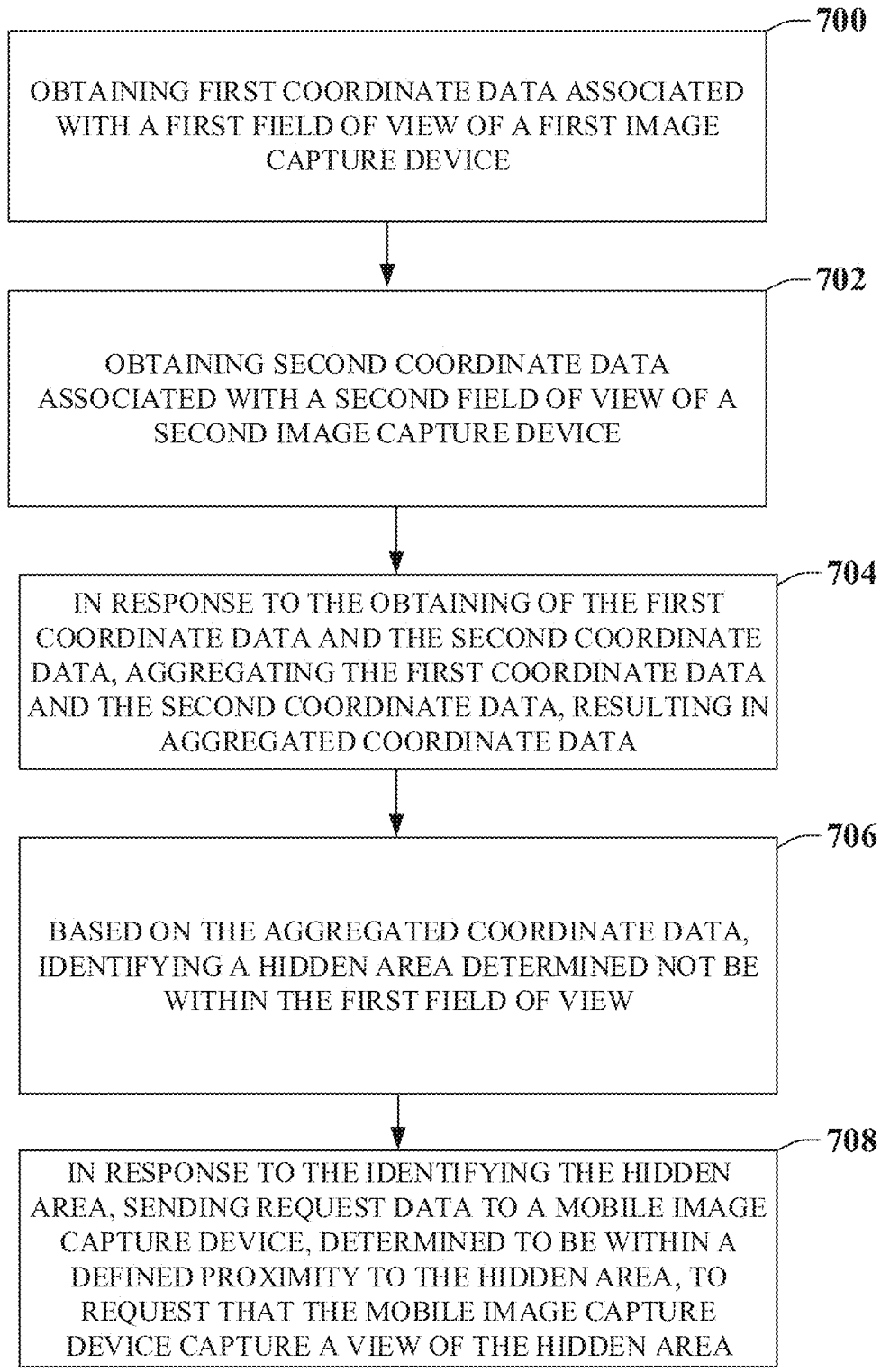
FIG. 7 illustrates an example flow diagram for a system for facilitating collaborative camera field of view mapping according to one or more embodiments.

Referring now to FIG. 7, illustrated is an example flow diagram for a system for facilitating collaborative camera field of view mapping according to one or more embodiments.

At element 700, the system can facilitate, obtaining first coordinate data associate with a first field of view of a first image capture device. At element 702, the system can facilitate obtaining second coordinate data associated with a second field of view of a second image capture device. In response to the obtaining of the first coordinate data and the second coordinate data, at element 704, the system can comprise aggregating the first coordinate data and the second coordinate data, resulting in aggregated coordinate data. Additionally, based on the aggregated coordinate data, at element 706, the system can comprise identifying a hidden area determined not be within the first field of view. Additionally, at element 708, in response to the identifying the hidden area, the system can comprise sending request data to a mobile image capture device, determined to be within a defined proximity to the hidden area, to request that the mobile image capture device capture a view of the hidden area.

Figure 8:
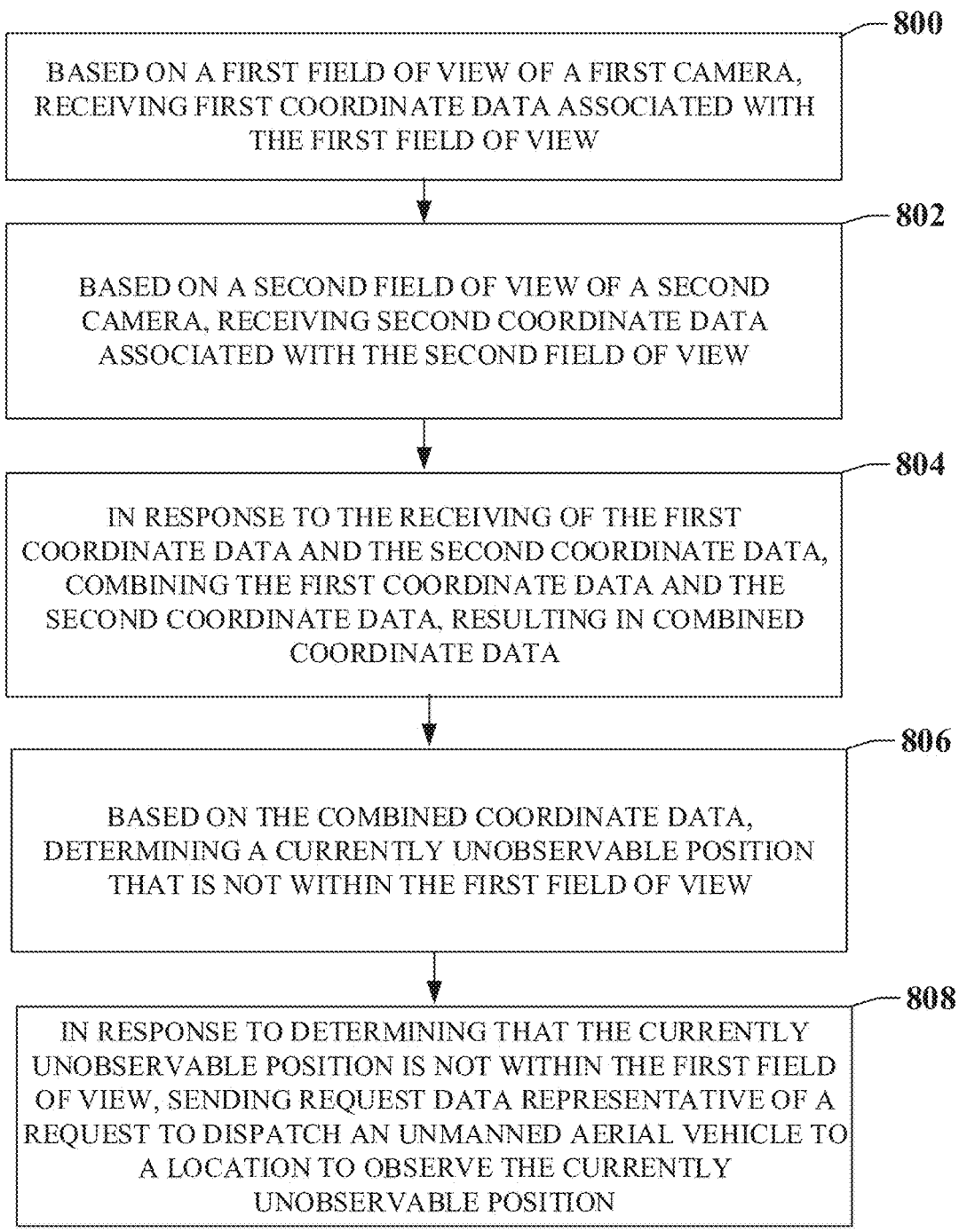
FIG. 8 illustrates an example flow diagram for a machine-readable medium for facilitating collaborative camera field of view mapping according to one or more embodiments.

Referring now to FIG. 8, illustrated is an example flow diagram for a machine-readable medium for facilitating collaborative camera field of view mapping according to one or more embodiments.

At element 800, the machine-readable medium can perform the operations comprising receiving first coordinate data associated with the first field of view based on a first field of view of a first camera. Based on a second field of view of a second camera, at element 802, the machine-readable medium can perform the operations comprising receiving second coordinate data associated with the second field of view. Additionally, at element 804, in response to the receiving of the first coordinate data and the second coordinate data, the machine-readable medium can perform the operations comprising combining the first coordinate data and the second coordinate data, resulting in combined coordinate data. Furthermore, at element 806, based on the combined coordinate data, the machine-readable medium can perform the operations comprising determining a currently unobservable position that is not within the first field of view. At element 808, in response to determining that the currently unobservable position is not within the first field of view the machine-readable medium can perform the operations comprising sending request data representative of a request to dispatch an unmanned aerial vehicle to a location to observe the currently unobservable position.

Figure 9:
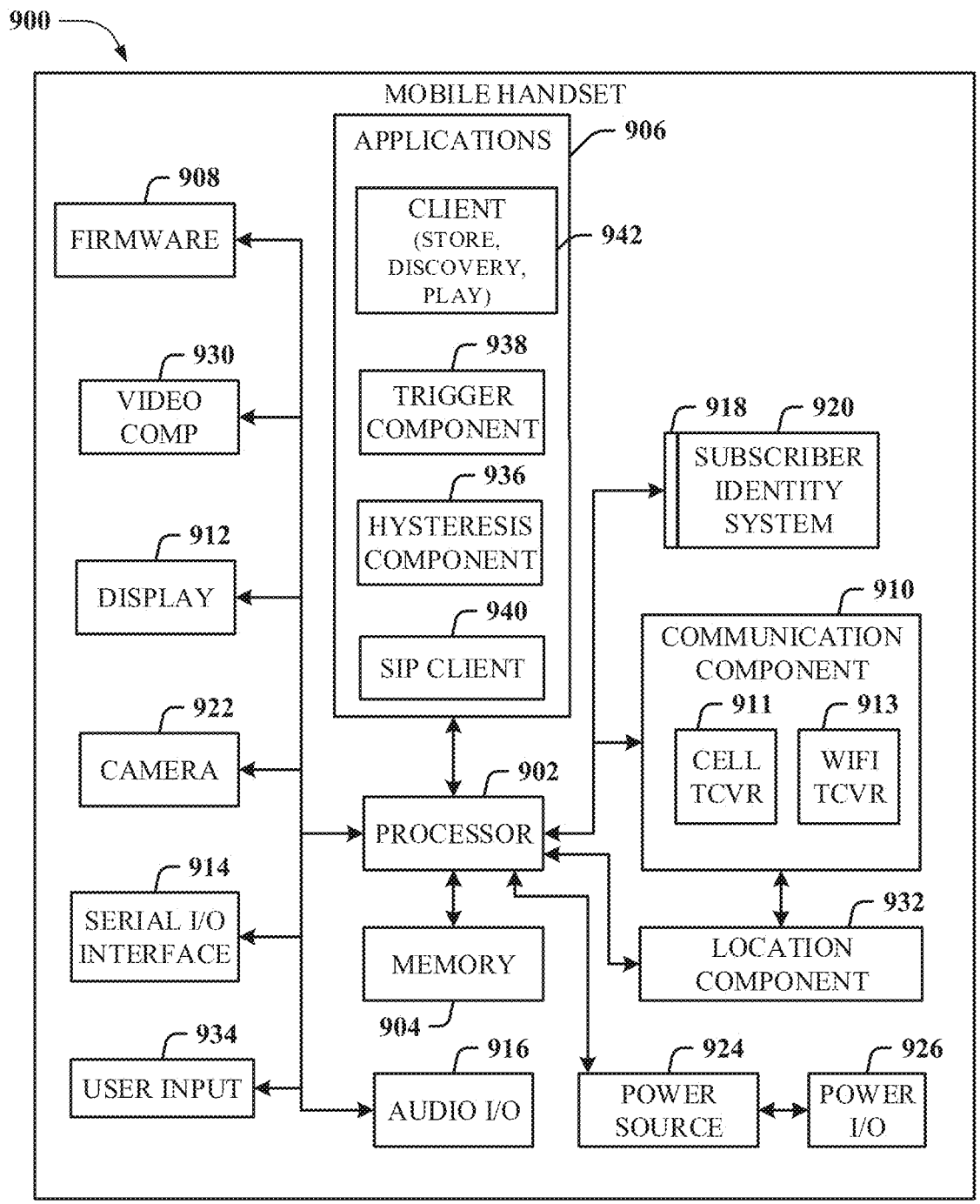
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
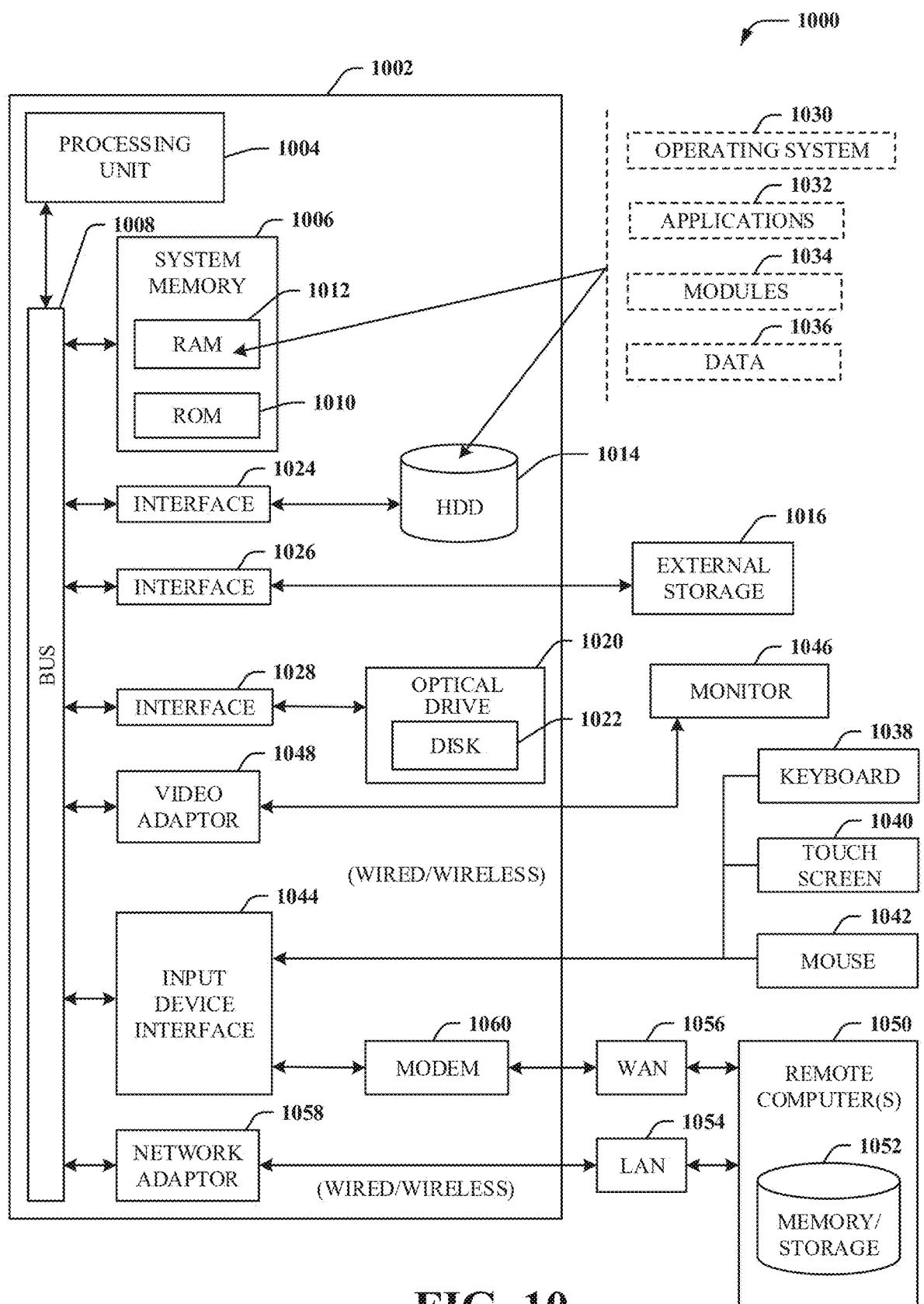
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by network equipment comprising a processor, first coordinate data based on a first field of view of a first camera;
receiving, by the network equipment, second coordinate data based on a second field of view of a second camera;
in response to receiving the first coordinate data and the second coordinate data, aggregating, by the network equipment, the first coordinate data and the second coordinate data, resulting in aggregated coordinate data;
based on the aggregated coordinate data, identifying, by the network equipment, a blind spot that is not within the first field of view or the second field of view;
in response to identifying the blind spot, dispatching, by the network equipment, a mobile camera relative to the blind spot to facilitate a third field of view comprising a view of the blind spot; and
in response to dispatching the mobile camera, generating, by the network equipment, a map as a function of a difference between a fourth field of view of the mobile camera at a first time after the dispatching and a fifth field of view of the mobile camera at a second time after the first time.

2. The method of claim 1, wherein the mobile camera is part of a drone device, and wherein dispatching the mobile camera comprises dispatching the drone device to facilitate the third field of view.

3. The method of claim 2, further comprising:
in response to dispatching the mobile camera, generating, by the network equipment, third coordinate data representative of the third field of view.

4. The method of claim 3, further comprising:
sending, by the network equipment, the third coordinate data to the first camera.

5. The method of claim 1, further comprising:
in response to identifying the blind spot, prompting, by the network equipment, the second camera to adjust an orientation of the second camera to be able to view the blind spot from a different view than the third field of view.

6. The method of claim 5, further comprising:
in response to prompting the second camera, receiving, by the network equipment, third coordinate data representative of a coordinate associated with the blind spot from the second camera.

7. The method of claim 6, further comprising:
in response to receiving the third coordinate data, sending, by the network equipment, the third coordinate data to the first camera.

8. A system, comprising:
a processor; and
a memory that stores executable instructions that, when executed by the processor, facilitate performance of operations, comprising:
obtaining first coordinate data associated with a first field of view of a first image capture device;
obtaining second coordinate data associated with a second field of view of a second image capture device;
in response to the obtaining of the first coordinate data and the second coordinate data, aggregating the first coordinate data and the second coordinate data, resulting in aggregated coordinate data;
based on the aggregated coordinate data, identifying a hidden area determined not be within the first field of view;
in response to the identifying the hidden area, sending request data to a mobile image capture device, determined to be within a defined proximity to the hidden area, to request that the mobile image capture device capture a view of the hidden area; and
in response to sending the request data, generating map data representative of a map comprising a difference between a third field of view of the mobile image capture device at a first time and a fourth field of view of the mobile image capture device at a second time after the first time.

9. The system of claim 8, wherein the operations further comprise:
in response to identifying the hidden area, accessing the second coordinate data to determine whether the hidden area is within the second field of view.

10. The system of claim 9, wherein the operations further comprise:
based on a determination that the hidden area is not within the second field of view, sending request data to a third image capture device to determine whether a third field of view, associated with the third image capture device, comprises the hidden area.

11. The system of claim 10, wherein the operations further comprise:
in response to sending the request data to the third image capture device, receiving, from the third image capture device, response data representative of a negative response indicative that the third field of view does not comprise the hidden area.

12. The system of claim 11, wherein the sending of the request data to the mobile image capture device comprises:
in response to receiving the response data, sending instruction data representative of an instruction to dispatch the mobile image capture device to the hidden area.

13. The system of claim 12, wherein the mobile image capture device is part of an autonomous vehicle.

14. The system of claim 8, wherein the first coordinate data is based on a light detection and ranging function of the first image capture device.

15. A non-transitory machine-readable medium, comprising executable instructions that, when executed by a processor, facilitate performance of operations, comprising:
based on a first field of view of a first camera, receiving first coordinate data associated with the first field of view;
based on a second field of view of a second camera, receiving second coordinate data associated with the second field of view;
in response to the receiving of the first coordinate data and the second coordinate data, combining the first coordinate data and the second coordinate data, resulting in combined coordinate data;
based on the combined coordinate data, determining a currently unobservable position that is not within the first field of view;
in response to determining that the currently unobservable position is not within the first field of view, sending request data representative of a request to dispatch an unmanned aerial vehicle to a location to observe the currently unobservable position; and
in response to sending the request data, creating map data representative of a map that represents a difference between a third field of view of the unmanned aerial vehicle at a first time and a fourth field of view of the unmanned aerial vehicle at a second time after the first time.

16. The non-transitory machine-readable medium of claim 15, wherein the operations further comprise:
in response to determining that the currently unobservable position is not within the first field of view, prompting the second camera to transition to an adjusted position that is different than a current position of the second camera, in order to observe the currently unobservable position via the second camera.

17. The non-transitory machine-readable medium of claim 16, wherein the operations further comprise:
in response to prompting the second camera, receiving third coordinate data representative of a third field of view of the second camera.

18. The non-transitory machine-readable medium of claim 17, wherein the operations further comprise:
based on the third coordinate data, determining that the currently unobservable position is not within the third field of view.

19. The non-transitory machine-readable medium of claim 18, wherein the unmanned aerial vehicle comprises a fourth camera.

20. The non-transitory machine-readable medium of claim 19, wherein the operations further comprise:
in response to facilitating dispatching the unmanned aerial vehicle, receiving fourth coordinate data representative of a fourth field of view associated with the fourth camera.

* * * * *